United States Patent
Leong et al.

(10) Patent No.: US 11,652,561 B2
(45) Date of Patent: May 16, 2023

(54) TECHNIQUES FOR DETERMINING TIMESTAMP INACCURACIES IN A TRANSCEIVER

(71) Applicant: Intel Corporation, Santa Clara, CA (US)

(72) Inventors: Han Hua Leong, Penang (MY); Sita Rama Chandrasekhar Mallela, Bangalore (IN); Muhammad Kazim Hafeez, Penang (MY); Ming-Shiung Chen, Santa Clara, CA (US); Anuj Agrawal, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 734 days.

(21) Appl. No.: 16/449,209

(22) Filed: Jun. 21, 2019

(65) Prior Publication Data

US 2019/0319729 A1    Oct. 17, 2019

(51) Int. Cl.
  *H04J 3/06* (2006.01)
  *G06F 11/16* (2006.01)
  *H04L 43/106* (2022.01)

(52) U.S. Cl.
  CPC ........ *H04J 3/0697* (2013.01); *G06F 11/1679* (2013.01); *H04J 3/0667* (2013.01); *H04L 43/106* (2013.01)

(58) Field of Classification Search
  None
  See application file for complete search history.

(56) References Cited

U.S. PATENT DOCUMENTS

| | | | |
|---|---|---|---|
| 9,001,951 B1 | 4/2015 | Kumpulainen | |
| 9,118,566 B1 | 8/2015 | Mendel et al. | |
| 9,300,421 B2 | 3/2016 | Yang et al. | |
| 2015/0381299 A1* | 12/2015 | Yang | H04L 7/0331 375/376 |
| 2017/0099131 A1* | 4/2017 | Bosch | H04L 41/082 |
| 2017/0111295 A1* | 4/2017 | Snowdon | G06F 13/00 |
| 2018/0041329 A1* | 2/2018 | Wang | H04W 56/0035 |
| 2019/0260568 A1* | 8/2019 | Pepper | H04L 43/106 |

FOREIGN PATENT DOCUMENTS

WO   WO-2018234951 A1 * 12/2018 ........... H04L 1/1874

OTHER PUBLICATIONS

Altera Corporation, "Altera 1588 System Solution," AN-739, Jan. 28, 2016, pp. 1-45.

* cited by examiner

*Primary Examiner* — Saumit Shah
(74) *Attorney, Agent, or Firm* — InventIQ Legal LLP; Steven J. Cahill

(57) ABSTRACT

An integrated circuit has a transceiver circuit and a memory circuit. The transceiver circuit includes stage circuits that each perform at least one function specified by a data transmission protocol. The transceiver circuit is coupled to receive packets of timing test patterns. Each of the stage circuits in the transceiver circuit generates a timestamp in response to receiving each of the packets of timing test patterns. Each of the stage circuits in the transceiver circuit generates a trigger indicating receipt of a predefined reference point in each of the packets of timing test patterns. The memory circuit stores each of the timestamps generated by the stage circuits in response to a respective one of the triggers and outputs the timestamps for analysis.

20 Claims, 5 Drawing Sheets

TECHNIQUES FOR DETERMINING TIMESTAMP INACCURACIES IN A TRANSCEIVER

FIELD OF THE DISCLOSURE

The present disclosure relates to electronic circuits, and more particularly, to techniques for determining timestamp inaccuracies in a transceiver circuit.

BACKGROUND

The Precision Time Protocol (PTP) is a protocol that is used to synchronize clock signals throughout a computer network. On a local area network, PTP can achieve clock accuracy in the sub-microsecond range, making it suitable for measurement and control systems. For example, PTP is used to synchronize financial transactions, mobile phone tower transmissions, sub-sea acoustic arrays, and networks that require precise timing but lack access to satellite navigation signals. PTP was originally defined in the IEEE 1588-2002 standard in 2002. In 2008, IEEE 1588-2008 was released as a revised standard. IEEE 1588-2008 is also known as PTP Version 2.

DETAILED DESCRIPTION

Figure 1:
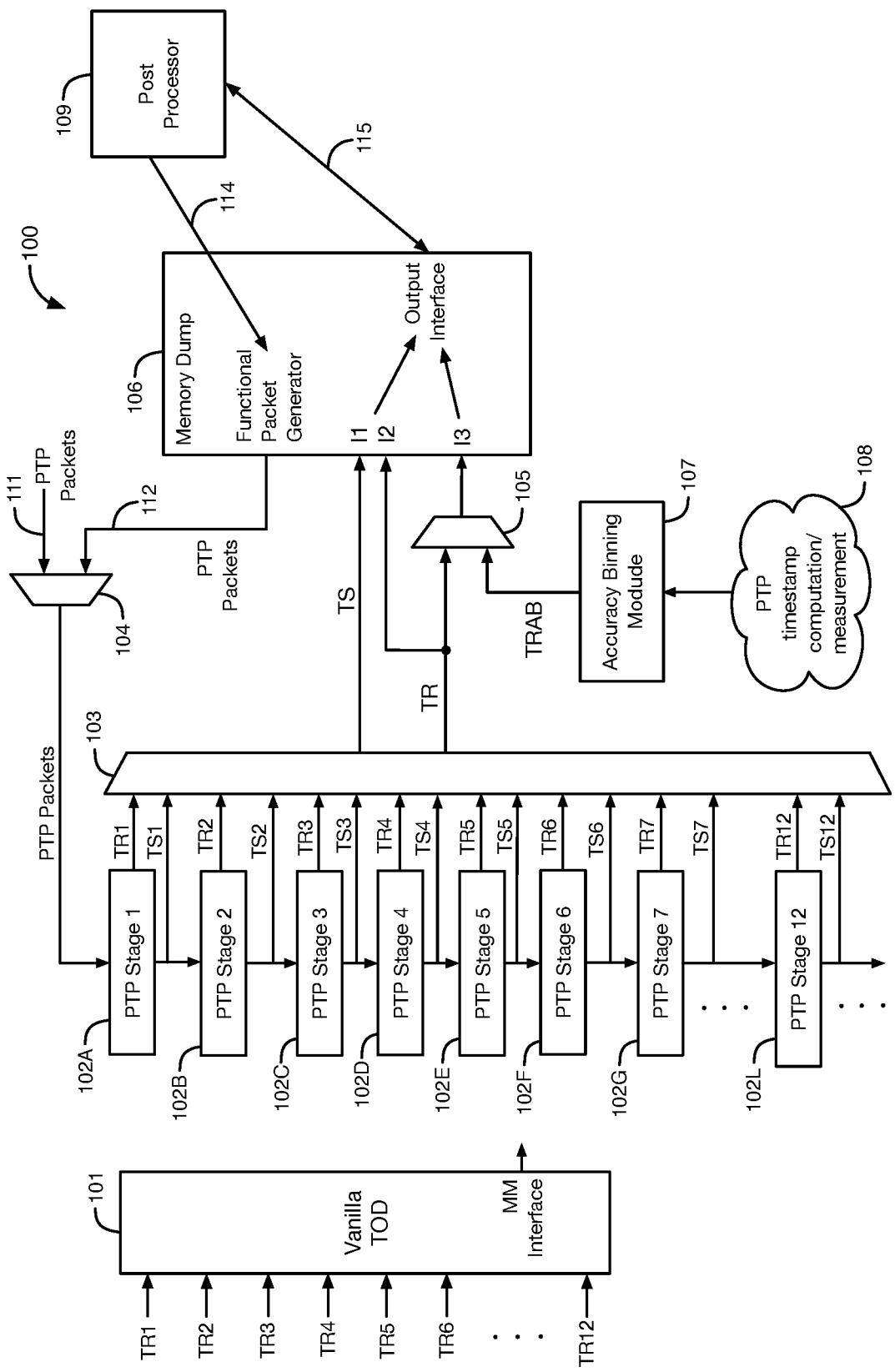
FIG. 1 illustrates an example of a PTP inspector system, according to an embodiment.

Precision Time Protocol (PTP) selects a master source of time for an IEEE 1588 domain and for each network segment in the domain. The master source of time periodically broadcasts the current time as a message containing a timestamp to the network segments in the domain. The master source of time uses a master clock signal to generate the timestamps. The network segments use the timestamps to determine the offset between their slave clock signals and the master clock signal in order to accurately synchronize the slave clock signals to the master clock signal. The accuracy of the timestamps in PTP is an important factor in the accuracy of the synchronization between the master and slave clock signals.

To achieve a higher timestamp accuracy for determining the delay and latency of clock signals that are being synchronized using the PTP IEEE 1588 standard, a PTP inspector system is provided that identifies where errors between timestamps and Time Of Day (ToD) messages originate, enabling quicker debug of offsets between clock signals in a network. The PTP inspector system enables on-die tuning capability with respect to timestamping accuracy and deterministic latency. The PTP inspector system can be used to enable functional self-test and self-calibration at the semiconductor die level, for example, to screen out semiconductor dies in each wafer before assembling each die on a package, which can improve die yield. The PTP inspector system enables built-in self-test and self-calibration for performing test capabilities. For example, the PTP inspector system can be used to determine clock signal delay accuracy for 1588/PTP timestamps. As another example, the PTP inspector system can be used to determine Common Public Radio Interface (CPRI) deterministic latency at the Physical Coding Sublayer (PCS) virtual lane of data transmitted according to the Open Systems Interconnection (OSI) model.

The PTP inspector system has the ability to categorize the timestamp accuracy range in fine granularity across multiple iterations. For example, the PTP inspector system can test millions of PTP packets and ensure that all of them are within a desired accuracy range. The PTP inspector system can identify the best achievable accuracy on various Ethernet feature combinations or permutations. The PTP inspector system can provide a method to determine the accuracy range of sub-blocks within integrated circuit devices that process data, and the data indicating the accuracy range can be collected across multiple iterations. For example, the PTP inspector system can be used to determine the best accuracy among a set of media access control (MAC) devices that have the same throughput. As another example, the PTP inspector system can be used to determine the best accuracy for a desired set of MAC devices having different throughputs. In some exemplary embodiments, the configuration of the PTP inspector system can be changed on the fly (e.g., using dynamic reconfiguration of a programmable logic integrated circuit) to switch from a current data transmission mode to a different but supportable data transmission mode, e.g., from 10 Gigabit Ethernet to 100 Gigabit Ethernet. The PTP inspector system can achieve average Constant Time Error (CTE) and Dynamic Time Error (DTE) among all or a subset of the ports of a transceiver.

FIG. 1 illustrates an example of a PTP inspector system, according to an embodiment. The PTP inspector system of Figure (FIG. 1 includes a PTP inspector circuit 100 and a post processor circuit 109. PTP inspector circuit 100 and post processor 109 can be in two separate integrated circuit (IC) dies or in the same IC die. The PTP inspector circuit 100 and post processor 109 can be manufactured in any type of integrated circuits, such as programmable logic integrated circuits (e.g., a field programmable gate arrays), microprocessor/central processing unit (CPU) ICs, or graphics processing units (GPU). Post processor 109 can, for example, be in a separate CPU/microprocessor, GPU, or programmable logic IC die.

PTP inspector circuit 100 includes a vanilla time of day (TOD) circuit 101, PTP stage circuits 102, multiplexer circuits 103-105, memory dump circuit 106 (also referred to herein as memory circuit 106), accuracy binning module 107, and PTP timestamp computation and measurement circuit 108. PTP stage circuits 102 are part of a transceiver circuit. PTP stage circuits 102 include any desired number N of stages. PTP inspector 100 includes 12 PTP stage circuits 102A-102L as an example. This example is not intended to be limiting. Figure (FIG. 1 shows 8 of the PTP stage circuits 102A-102G and 102L. Each of the PTP stage circuits 102 resides in a different functional block of the transceiver. Some or all of the PTP stage circuits 102 can perform functions associated with a different layer or different sublayer of a data transmission protocol.

For example, the PTP stage circuits 102A and 102L can perform the functions associated with Advanced Interface Bus (AIB), which is a die-to-die physical (PHY) level data transmission standard. In this example, PTP stage 102A performs the functions associated with AIB for data to be transmitted by the transmitter in the transceiver, and PTP stage 102L performs the functions associated with AIB for data received by the receiver in the transceiver. As another example, PTP stage circuit 102B and another PTP stage circuit 102K not shown in FIG. 1 can perform functions associated with the media access control (MAC) sublayer of Ethernet standards. In this example, PTP stage 102B performs MAC sublayer functions for data transmitted by the transmitter, and PTP stage 102K performs MAC sublayer functions for data received by the receiver.

As another example, PTP stage circuit 102C and another PTP stage circuit 102J not shown in FIG. 1 can perform functions associated with the Physical Coding Sublayer (PCS) of Ethernet standards. In this example, PTP stage 102C performs PCS functions for data to be transmitted by the transmitter, and PTP stage 102J performs PCS functions for data received by the receiver. As another example, PTP stage circuit 102D and another PTP stage circuit 102I not shown in FIG. 1 can perform forward error correction (FEC) functions that are part of Ethernet standards on top of the MAC, PCS and Physical Medium Attachment (PMA) sublayers. In this example, PTP stage 102D performs the FEC functions for data to be transmitted by the transmitter, and PTP stage 102I performs the FEC functions for data received by the receiver. As another example, PTP stage circuit 102E and another PTP stage circuit 102H not shown in FIG. 1 can perform functions associated with the Physical Medium Attachment (PMA) sublayer of Ethernet standards. In this example, PTP stage 102E performs PMA functions for data to be transmitted by the transmitter, and PTP stage 102H performs PMA functions for data received by the receiver. As another example, PTP stage circuit 102F demultiplexes blocks of data received by the receiver into virtual lanes, and PTP stage circuit 102G performs alignment of the blocks of data in the virtual lanes.

The process of improving the accuracy of timestamps for synchronizing clock signals according to PTP is now described in more detail. Referring to FIG. 1, PTP packets (also referred to as PTP messages) are transmitted to PTP stage circuits 102 through multiplexer circuit 104. The PTP packets may, e.g., include one or more timestamps generated as test data by a test system or generated by a master source of time. The PTP packets can, for example, be transmitted to multiplexer circuit 104 from memory circuit 106 through input line 112. In this example, a functional packet generator in memory circuit 106 or in post processor 109 generates test PTP packets and transmits the test PTP packets to multiplexer circuit 104 through input line 112. The functional packet generator can contain a vector of random access memory (RAM) in memory circuit 106 that can be programmed externally (e.g., by post processor 109) as a protocol-specific functional generator of PTP packets for calibration or performance tests. As an example, the post processor 109 can provide a predefined Golden Pattern to program the functional packet generator in the memory circuit 106. If the functional packet generator is in post processor 109, the post processor 109 generates the test PTP packets and transmits the test PTP packets to memory circuit 106 via signal lines(s) 114. Memory circuit 106 then transmits the test PTP packets to multiplexer 104 via input line 112.

As another example, PTP packets can be transmitted to multiplexer circuit 104 through input line 111 from a source outside of PTP inspector circuit 100. For example, other circuitry within the same integrated circuit as PTP inspector circuit 100 can generate test PTP packets and transmit the test PTP packets to multiplexer 104 via input line 111. As another example, another integrated circuit or system external to the integrated circuit containing PTP inspector circuit 100 can generate test PTP packets and transmit the test PTP packets to multiplexer 104 through external links and input line 111. Also, PTP packets and/or data packets can be transmitted to multiplexer circuit 104 via input line 111 during normal operation.

Multiplexer 104 selects the PTP packets from input line 111 or 112 in response to a control input received from a control circuit. The PTP packets selected by multiplexer 104 are then provided to the input of PTP stage circuit 102A. The PTP packets are processed by each of the N number of PTP stage circuits 102 and then transmitted to the next PTP stage circuit 102 for processing in the order shown by the downward pointing arrows connecting the PTP stages 102 in FIG. 1. For example, after being processed by PTP stage circuit 102A, the PTP packets are transmitted to PTP stage circuit 102B. The PTP packets are then processed by PTP stage circuit 102B and subsequently transmitted to PTP stage circuit 102C. The PTP packets are then processed by and transmitted to each subsequent PTP stage circuit 102C-102L.

Each of the PTP stage circuits 102 generates (e.g., asserts) a trigger for each of the PTP packets received from multiplexer 104 or from a previous PTP stage 102. Each of the PTP stage circuits 102 may, for example, generate a trigger for each received PTP packet upon detecting the delimiter of the start of the packet (SOP) or the end of the packet. Thus, each trigger can indicate the start or the end of each received PTP packet. Each of the PTP stage circuits 102 also generates a timestamp in response to receiving each of the PTP packets. Each timestamp may, for example, indicate the time when the PTP stage circuit 102 generated the corresponding trigger for each received PTP packet. As an example, if the trigger indicates the SOP for a PTP packet, then the timestamp generated by each PTP stage circuit 102 for that same PTP packet may indicate the time that the PTP stage circuit 102 received the start of that PTP packet. As another example, if the trigger indicates the end of packet for a PTP packet, then the timestamp generated by each PTP stage circuit 102 for that same PTP packet indicates the time that the PTP stage circuit 102 received the end of that PTP packet. As yet another example, each PTP stage circuit 102 may generate the timestamps by performing calculations on timestamps that are embedded in the received PTP packets.

Each of the PTP stage circuits 102 outputs a trigger and a timestamp as two sets of output signals TRn and TSn, respectively, for each of the PTP packets received via multiplexer circuit 104. For example, PTP stage circuit 102A generates an output signal TR1 that indicates a trigger for each PTP packet and output signals TS1 that indicate a timestamp for each PTP packet. PTP stage circuits 102B-102L generate output signals TR2-TR12, respectively, that indicate triggers for each received PTP packet and output signals TS2-TS12, respectively, that indicate timestamps for each received PTP packet.

The signals TR1-TR12 indicating the triggers and the sets of signals TS1-TS12 indicating the timestamps are provided to multiplexing inputs of multiplexer circuit 103. Multiplexer circuit 103 provides the timestamp indicated by each set of the signals TS1-TS12 to the I1 input of memory circuit 106 as signals TS. Multiplexer circuit 103 also provides the trigger indicated by each of the signals TR1-TR12 to the I2 input of memory circuit 106 as signal TR. The timestamps and the triggers are provided to memory circuit 106 in a sequential order. For example, multiplexer circuit 103 may provide the timestamp and the trigger output by each PTP stage circuit 102 to inputs I1 and I2 of memory circuit 106 in response to the respective trigger TRn output by the respective PTP stage circuit 102 being asserted. The timestamps are captured and stored in memory circuit 106 (e.g., as part of RAM content) based on the respective triggers being asserted. For example, memory circuit 106 can start to write each timestamp to RAM via input I1 in response to the trigger associated with that timestamp being asserted at input I2.

The triggers are also routed indirectly to memory circuit 106 via multiplexer circuit 105. When multiplexer circuit 105 is configured to provide signal TR to its output, the trigger currently indicated by signal TR is provided to input I3 of memory circuit 106 and stored in memory circuit 106. Each of the triggers that is indicated by signal TR and provided to input I3 is captured and stored as a sideband signal in memory circuit 106 via multiplexer 105 along with the corresponding timestamp data in signals TS. Thus, each of the triggers generated by PTP stage circuits 102 while multiplexer 105 is configured to provide signal TR to input I3 is stored in memory circuit 106. Multiplexer 105 may be configured to provide signal TRAB to input I3 at various other times, as described in further detail below.

The timestamps and triggers are then transmitted from memory circuit 106 to post processor circuit 109 through an output interface in memory circuit 106 via signal line(s) 115. The triggers are sideband signals along with the timestamp data to be captured by the memory circuit 106 so that the PTP timestamps are stored at the block level and can be post-processed later by post processor 109. Post processor 109 determines the inaccuracies in the timestamps at each of the PTP stage circuits 102 using the timestamps received from each of the PTP stage circuits 102, as discussed in further detail below.

Figure 2:
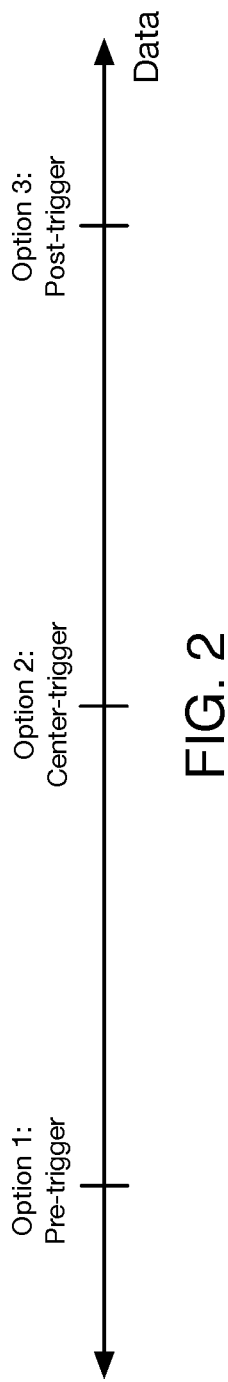
FIG. 2 illustrates three different options for how to capture the full range of PTP timestamp data to a memory circuit, according to an embodiment.

FIG. 2 illustrates 3 different options for when to capture the full range of PTP timestamp data to memory circuit 106. The PTP timestamp data generated by the PTP stage circuits 102 can be captured and stored in memory circuit 106 pre-trigger (option 1), center-trigger (option 2), or post-trigger (option 3), as shown in FIG. 2.

An example of a Precision Time Protocol (PTP) synchronization process is now described. The PTP synchronization process involves ToD (Time of Day) offset correction and frequency correction between a master clock signal used by a master device (i.e., a master source of time) and a slave clock signal used by a slave device. The slave device collects data needed to synchronize its slave clock signal with the master clock signal through event messages. The master and slave devices each generate event messages and exchange the event messages with each other. The master and slave devices include a timestamp in each of the event messages. 6 event messages having 6 timestamps T1-T6 are now described as an example. T1 is the time that a first sync message is transmitted from the master device. T2 is the time that the first sync message is received at the slave device. T3 is the time that a delay request message is transmitted the slave device. T4 is the time that the delay request message is received at the master device. T5 is the time that a second sync message is transmitted from the master device. T6 is the time that the second sync message is received at the slave device.

First, the slave device collects the timestamps T1, T2, T3 and T4 through the event messages Sync, delay request, and delay response and calculates the mean path delay (MPD). PTP timestamp computation/measurement circuit 108 in the slave device may, for example, measure timestamps T1, T4, and T5 and generate timestamps T2, T3, and T6. Second, at the second sync message, the slave device calculates the ToD offset by subtracting the MPD from the result of T6−T5 and adjusts its ToD counter accordingly. Next, the slave device calculates the Frequency Offset by comparing the time difference in frequency between 2 successively transmitted and received sync messages per the equation Frequency Offset=(Fo−Fr)/Fr, where Fo=1/(T5−T1) and Fr=1/(T6−T2).

The slave device calculates the ToD offset and Frequency Offset continuously to maintain its ToD counter corresponding to the master clock signal to the best possible accuracy. This may be accomplished through frequent synchronization offset adjustments after the initial ToD offset adjustment and occasional ToD offset adjustments. The slave device calculates the ToD offset using the equations ToD offset=T6−T5−MPD, and MPD=((T2−T1)+(T4−T3))/2. The slave device then supplies the calculated ToD offset and Frequency Offset to a servo algorithm that may, for example, be in PTP timestamp computation/measurement circuit 108. This algorithm can either adjust the frequency of the slave clock signal using the Frequency Offset, or synchronize the slave device's ToD with the master device's ToD using the ToD offset. The slave device uses the slave clock signal to generate the slave device's ToD.

Referring again to FIG. 1, the signals TR1-TR12 indicating the triggers are also provided to inputs of the vanilla ToD circuit 101. Vanilla ToD circuit 101 calculates a PTP timestamp difference based on the triggers indicated by signals TR1-TR12 being asserted. The vanilla ToD 101 may then calculate the ToD offset and the Frequency Offset that are described above using the timestamps generated by PTP stages 102, the timestamps indicated by the PTP packets received via multiplexer circuit 104, timestamps generated by PTP timestamp computation/measurement circuit 108, and/or the PTP timestamp difference indicated by the triggers asserted in signals TR1-TR12. The vanilla ToD circuit 101 uses the triggers as references or correction factors for determining the ToD offset and the Frequency Offset. The ToD offset and the Frequency Offset calculated by the vanilla ToD circuit 101 are transmitted via a memory-mapped (MM) interface to PTP computation/measurement circuit 108 and post processor 109 (e.g., using memory circuit 106). The ToD offset and the Frequency Offset calculated by the vanilla ToD circuit 101 are used by the slave device to synchronize the slave clock signal with the maser clock signal and/or to synchronize the slave device's ToD with the master device's ToD. The vanilla ToD circuit 101 can calculate the phase difference as well as the frequency parts per million difference between different clock domains, such as transmission (TX) phase-lock loop (PLL) clock signals and receiver (RX) clock and data recovery (CDR) clock signals.

Figure 3:
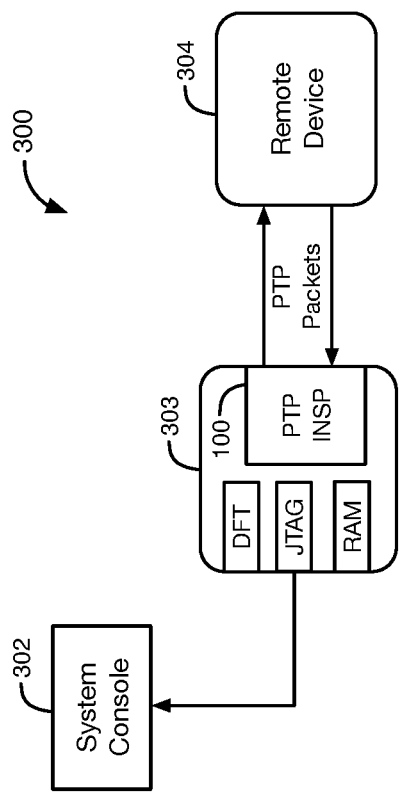
FIG. 3 shows a block diagram of an exemplary computer system that can be used with the PTP inspector system of FIG. 1 to provide transparency into device timing and latency accuracy at various points in a PTP data path, according to an embodiment.

FIG. 3 shows a block diagram of an exemplary computer system 300 that can be used with PTP inspector circuit 100 of FIG. 1 to provide transparency into device timing and latency accuracy at various points in a PTP data path, according to an embodiment. System 300 includes a system console 302, a semiconductor integrated circuit (IC) device 303, and a remote device 304. IC device 303 includes PTP inspector circuit 100, a JTAG interface, RAM, and a design for test (DFT) circuit. PTP inspector circuit 100 exchanges PTP packets with remote device 304 through external links. The timestamps and time of day generated by PTP inspector 100 are provided to post processor 109. Post processor 109 may be in system console 302 and/or in the DFT circuit in device 303. The output of the DFT circuit and/or the PTP inspector circuit 100 is transmitted through the JTAG interface and external links to system console 302. The outputs of the post processor 109 can be displayed to a user through a user interface in system console 302. System 300 can compensate for any average constant time error (CTE) and/or dynamic time error (DTE) in the timestamps that are caused by system timing inaccuracies. System 300 can show the real time status of latency inaccuracies in clock signals that are being synchronized by performing live communication with IC device 303.

Figure 4:
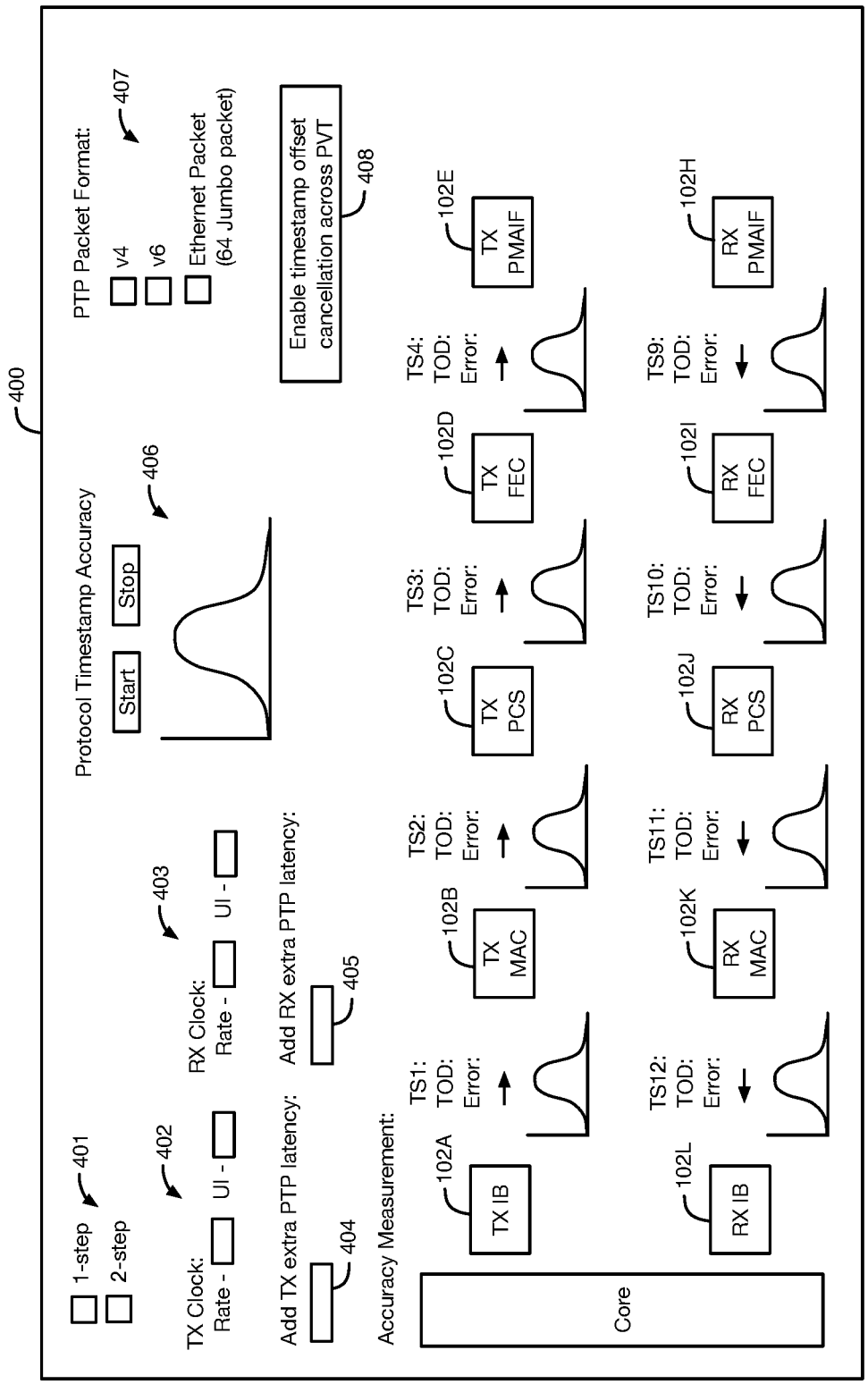
FIG. 4 illustrates an example of a graphical user interface (GUI) that can be used to interface with the PTP inspector system of FIG. 1, according to an embodiment.

FIG. 4 illustrates an example of a graphical user interface (GUI) 400 that can be used to interface with the PTP inspector system of FIG. 1, according to an embodiment. The user can use the data indicated by GUI 400 to budget the total system-level accuracy requirement for optimizing the transmission of PTP packets in the system.

GUI 400 provides graphical data to the user that indicates how the time error in the PTP packets is distributed across the PTP stage circuits 102 in PTP inspector circuit 100. For example, the protocol timestamp accuracy interface 406 in GUI 400 may allow a user to use the system console 302 to interact with the DFT tool and PTP inspector circuit 100 to retrieve PTP timestamp and ToD data. For example, system console 302 can use interface 406 to plot the histogram or Gaussian distribution curve of the PTP timestamps received from PTP inspector circuit 100 for a large number of PTP packets with statistical analysis (e.g., mean or standard deviation) and any other means that represent the source of PTP timestamp inaccuracy for the chosen configuration for analysis, debug, and optimization. Plots for the histograms or Gaussian distribution curves of the PTP timestamps can be displayed for each of the PTP stage circuits 102. FIG. 4 shows a plot displayed in GUI 400 for each of the PTP stage circuits 102A-102E and 102H-102L. GUI 400 can display a timestamp (TS), a time of day (ToD), and/or a timestamp error for each of the PTP stage circuits 102.

GUI 400 shown in FIG. 4 can provide additional features as well, such as the ability to select 1-step or 2-step according to the IEEE 1588 standard using options provided in interface 401, the ability to select the transmitter (TX) clock rate and unit interval (UI) in interface 402, and the ability to select the receiver (RX) clock rate and unit interval (UI) in interface 403. GUI 400 of FIG. 4 also provides the ability to select the PTP packet format type (e.g., v4, v6, Jumbo packet, etc.) using options provided in interface 407, the ability to add extra latency for compensation of CTE in the transmitter using an option provided in interface 404, the ability to add extra latency for compensation of CTE in the receiver using an option provided in interface 405, and the ability to track latency accuracies and enable timestamp offset cancellation across process, voltage, and temperature (PVT) variations in IC device 303 using option 408.

The PTP inspector system of FIG. 1 can be used to perform PTP 1-step and 2-step timestamp functional checks and accuracy measurements either at the semiconductor die-level or the customer system level. The process starts with the functional packet generator (e.g., in memory circuit 106 or post processor 109) sending the PTP packets to the PTP stage circuits 102, as described above. Then, the PTP stage circuits 102 capture the timestamp information in each PTP packet. In 1-step, functional first-in-first-out (FIFO) buffers in the respective PTP stage circuits 102 store the intermediate timestamps corresponding to the packets sent, and the final timestamp for each packet is calculated and inserted in the packet itself. In 2-step, functional FIFO buffers in the respective PTP stage circuits 102 store the timestamps corresponding to the packets sent. Then, the intermediate timestamps and the packets carrying the final timestamps in case of 1-step or the timestamps in case of 2-step are output as signals TS1, TS2 . . . TSn and transmitted through multiplexer 103 to memory circuit 106 in PTP inspector 100, where the timestamps are stored before being output for post-processing by post processor 109.

During the post processing, post processor 109 determines the difference between the timestamps generated by the transmitter (TX) PTP stage circuits (e.g., PTP stage circuits 102A-102E) and the timestamps generated by the receiver (RX) PTP stage circuits (e.g., PTP stage circuits 102H-102L). The timestamps generated by the transmitter (TX) PTP stage circuits indicate the delay in the transmitter to transmit PTP packets, and the timestamps generated by the receiver (RX) PTP stage circuits indicate the delay in the receiver to receive PTP packets. The difference between the delay indicated by the transmitter timestamps and the delay indicated by the receiver timestamps may indicate an inaccuracy in the PTP timestamps. Ideally, the difference between the transmitter timestamps and the receiver timestamps is zero. If the difference between the transmitter and receiver timestamps is non-zero, then an inaccuracy is present in the PTP timestamps.

Post processor 109 can determine the deterministic delay in the data path of the PTP packets at each of the PTP stage circuits 102 using the timestamps received from each of the PTP stage circuits 102. Because post processor 109 receives timestamps generated by each of the PTP stage circuits 102, post processor 109 can determine the inaccuracies in the timestamps at each of the PTP stage circuits 102. GUI 400 then receives these timestamp inaccuracies from post processor 109 and displays plots of the histograms or Gaussian distribution curves of these timestamp inaccuracies for each of the PTP stage circuits 102, as shown in FIG. 4. The inaccuracy for different throughputs of the MAC indicates which MAC devices yield the best accuracy for the timing protocols such as IEEE-1588/PTP. The system design can then be modified accordingly.

The post processor 109 analyzes the timestamps to determine which of the PTP stage circuit(s) 102 are generating inaccuracies in the timestamps. Post processor 109 calculates the value of the timestamp inaccuracy contributed by each of these PTP stage circuits 102. Providing fine granularity into intermediate timestamps at each PTP stage circuit 102 makes it easier to determine how much each PTP stage circuit 102 is contributing to any inaccuracies in the timestamps. After determining the values of any timestamp inaccuracies at each PTP stage circuit 102, various techniques can be used to compensate for these timestamp inaccuracies. For example, any missing delays in the data paths of the PTP packets that are previously unaccounted for can be introduced into the transmitter or receiver data paths by adding extra delay (e.g., using adjustable delay circuits). These techniques make debugging PTP timestamp inaccuracies much more effective. Also, the timestamp inaccuracies can be used to sort out and tune the functional blocks in the transceiver according to a desired accuracy range. The post processing performed by post processor 109 can be carried out under different PVT conditions for one or more IC devices 303, for different MAC throughput, and also for different clock synchronization protocols. The information generated during this process also helps in planning for future devices.

The PTP inspector system of FIGS. 1-4 can achieve a deterministic latency requirement for the transmission of PTP packets with accurate information coming very early in the IC design cycle. The PTP inspector system of FIGS. 1-4 allows a user to perform system level validation and optimization to achieve the user's requirements in the product qualification process. Also, the PTP timestamps generated at some or all of the PTP stage circuits 102 can be provided to the final PTP stage circuit at the PMA for the same PTP packet, which allows the timestamp inaccuracy distribution through some or all of the PTP stage circuits 102 to be studied in detail. This approach also helps to potentially eliminate inaccuracy for each configuration by monitoring each PTP stage circuit 102 precisely.

The PTP inspector system of FIGS. 1-4 improves PTP timestamp accuracy by tracking PVT variation within a single IC die and across multiple IC dies. For example, the PTP inspector system can measure the PTP packet delay at different PVT corners for batches of IC dies, and the delay values can be stored in a lookup table during semiconductor characterization. In this example, PTP timestamp offset compensation can be performed by tracking the PVT variation of a set of IC dies and then accessing the corresponding delay values from the characterized lookup table to generate the PTP timestamp offset compensation for each of the IC dies accordingly.

Figure 5:
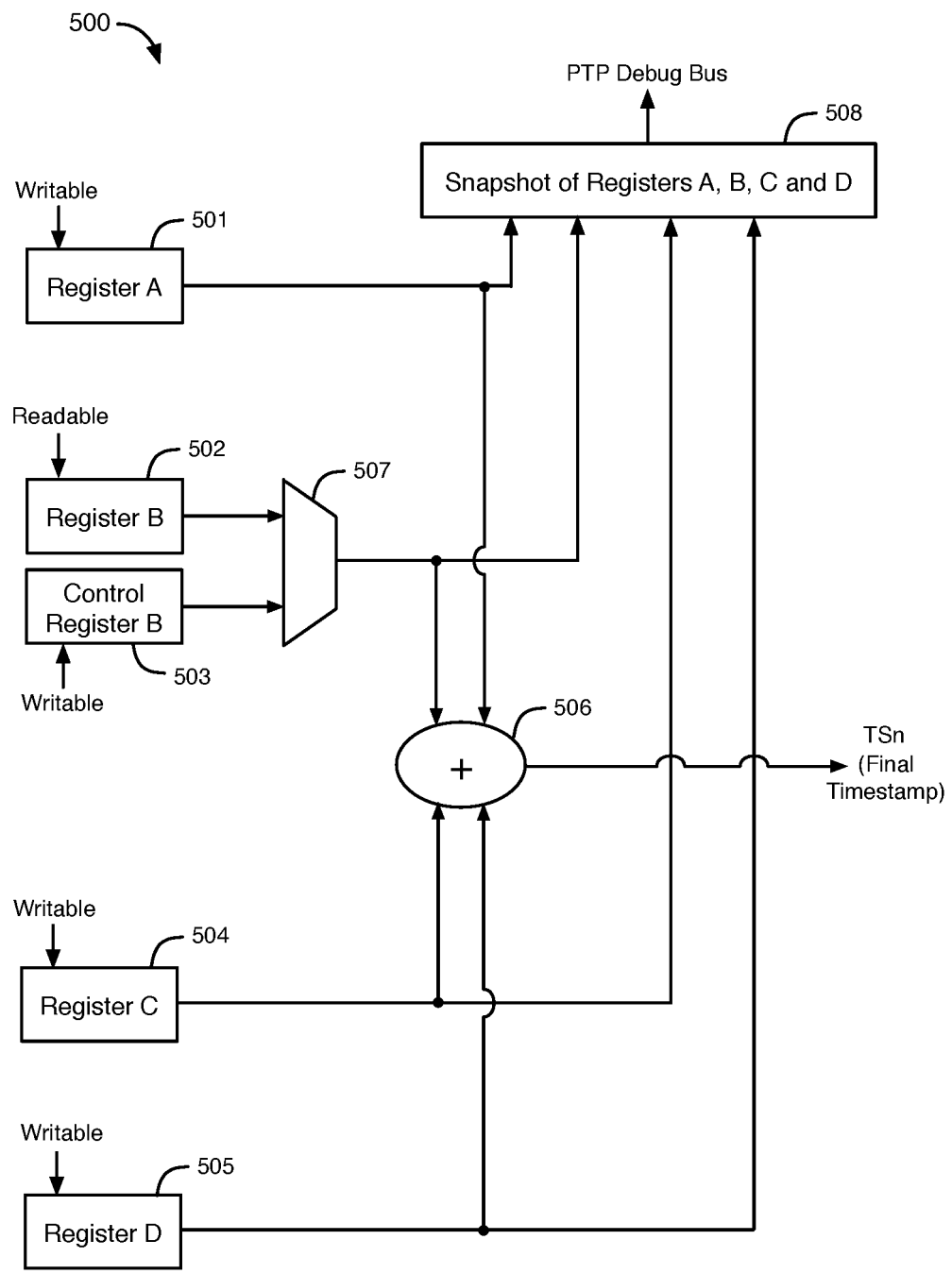
FIG. 5 illustrates an example of how the PTP timestamps can be calculated in each of the PTP stage circuits using a complement addition circuit, according to an embodiment.

FIG. 5 illustrates an example of how the PTP timestamps can be calculated in each of the PTP stage circuits 102 using a complement addition circuit 500, according to an embodiment. In the embodiment of FIG. 5, each of the PTP stage circuits 102 in PTP inspector circuit 100 includes a complement addition circuit 500. The complement addition circuit 500 of FIG. 5 includes register circuits 501-505, adder circuit 506, multiplexer circuit 507, and snapshot of registers circuitry 508. One or more of the registers 501-505 store timestamps received in the PTP packets via multiplexer 104. Each of the registers 501, 502, 503/504, and 505 may, for example, store timestamps in 4 different lanes A-D of each received packet.

Adder circuit 506 adds and/or subtracts the timestamp values stored in register A 501, register B 502 or 503, register C 504, and register D 505 to generate a final timestamp that is output by the PTP stage circuit 102 in signals TSn. As a specific example that is not intended to be limiting, the final timestamp can have 96-bits that include 6-Bytes or 48-bits of seconds, 4-Bytes/32-bits of nanoseconds, and 6-bits of fractional nanoseconds.

To debug the final timestamp value, all the constituent registers 501-505 are fully controllable, for example, by post processor 109, such that the registers A-D are writable or multiplexed with writable registers in case the original register is not writable. In the example of FIG. 5, post processor 109 can write values to any of registers 501, 503, 504, and 505, and post processor 109 can read values from register 502. Registers 502 and 503 are multiplexed by multiplexer 507 to generate the output of register B. Making the timestamp values stored in the constituent registers 501-505 controllable allows the effect of an individual register value on the final timestamp calculation to be analyzed. As an example, in FIG. 5, the values in register A 501, register C 504, and register D 505 can be kept constant, and only the values in register B 502/503 can be varied functionally by post processor 109 so that the functional impact of register B on the final timestamp calculation can be assessed.

Circuit 500 also provides observability into all of the constituent registers A-D that yield the final timestamp value. Circuitry 508 takes a snapshot of the values stored in registers A-D for every PTP packet timestamp computation. The values received from registers A-D are then sent from circuitry 508 through a PTP debug bus to a debugger (e.g., in post processor 109), along with the packet's identification. The individual components that yield the final timestamp can be later graphically analyzed by post processor 109 for their variations, such as CTE and DTE. Post processor 109 can then assess which of the components of the timestamp are contributing more to the errors. This technique provides the ability to zero down into the constituent parts of the timestamp calculation to locate the source of errors.

Referring again to FIG. 1, PTP inspector circuit 100 includes accuracy binning module 107 and PTP timestamp computation and measurement circuit 108 that bin the accuracy range based on a large number (e.g., millions) of PTP packets. PTP timestamp computation and measurement circuit 108 performs functions specified in the PTP 1588 standard, including calculating timestamps for transmitted event messages, measuring timestamps in received event messages, and/or calculating a time of day (ToD). The accuracy binning module 107 is a segregator that puts the timestamps output by PTP stage circuits 102 in respective bins based on the measured accuracy range. Accuracy binning module circuit 107 can, for example, be used to plot the histogram or Gaussian distribution curve for reporting and analysis accordingly. The accuracy binning module 107 and the PTP timestamp computation and measurement circuit 108 may, for example, be programmable logic circuits in a field programmable gate array (FPGA) and that are programmed according to a user configuration to perform the functions described herein for circuits 107-108.

The accuracy binning module 107 can determine if any of the timestamps output by PTP stage circuits 102 is an outlier (e.g., outside a desired range) compared to a corresponding timestamp output by PTP timestamp computation and measurement circuit 108. If a timestamp indicated by signals TS is determined to be an outlier, the accuracy binning module 107 asserts its output signal TRAB to cause memory circuit 106 to capture the timestamp indicated by signals TS. For example, when the trigger indicated by signal TR is asserted, the trigger is captured as a sideband signal in memory circuit 106 via multiplexer 105 along with the timestamp indicated by signals TS. If the accuracy binning module 107 determines that the current timestamp indicated by signals TS is an outlier, module 107 asserts its output signal and reconfigures multiplexer 105 to pass the asserted signal TRAB to the I3 input of memory circuit 106. In response to signal TRAB being asserted via multiplexer 105, memory circuit 106 stores the timestamp indicated by signals TS for the respective PTP stage circuit 102 in one of the bins. Memory circuit 106 also stores data indicating which lane has the SOP or end of packet. This data stored in memory circuit 106 is then provided to post processor 109 for post-processing.

The post-processing script used by post processor 109 depends on which of the PTP stage circuits 102 generates the received timestamp data. For example, post processor 109 can decode and descramble the recorded scrambled data from the PCS using a post-processing script. As another example, post processor 109 can process the output data of the transmitter forward error correction (FEC) stage circuit 102 by hooking up the receiver FEC, the virtual lane demultiplexer, the SOP alignment, the de-stripe, descrambler, and decoder in the post processor 109. As such, the post processor 109 can determine the SOP format at the transmitter FEC output data stream.

Both the last known SOP trigger and the transmitter serial data can be captured using an oscilloscope. According to the post-processing format of the required PTP stage circuit 102, the location of SOP in the serial data stream can be identified across process, voltage, and temperature (PVT) variations within a single IC die and/or across multiple IC dies. As such, the digital delays within the transmitter and the receiver can be determined and categorized based on PVT variations. The offsets in the timestamps across PVT variations can then be accurately compensated for.

The analog behavior of the data in terms of accuracy across PVT variations can be binned and stored in a look-up table. The analog behavior of the data across PVT variations that can be binned and stored in a look-up table includes, for example, the clock skew between the MAC and the PMA serializer/deserializer (SerDes), behavior of the SerDes input/output buffer, mis-balance of delay paths that happen internally within one PTP stage circuit 102, and clock jitter. The difference in time between the trigger for the last known SOP and the time that the SOP appears at the next PTP stage circuit 102 is the delay between adjacent PTP stage circuits 102.

Figure 6:
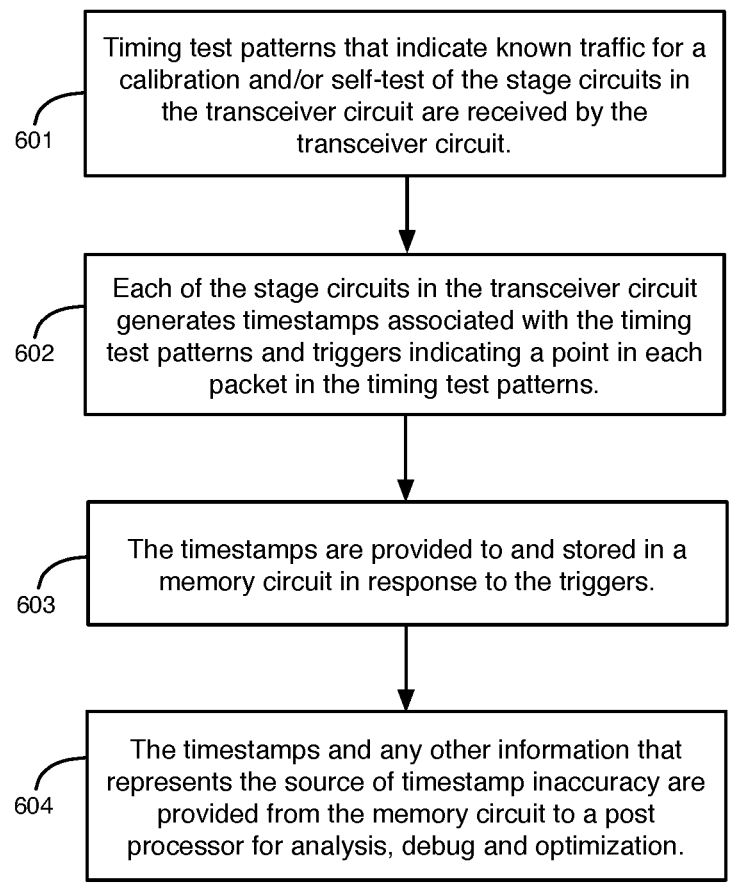
FIG. 6 illustrates examples of operations that can be performed by the PTP inspector system of FIGS. 1-5 to determine inaccuracies in timestamps that are generated according to a protocol, according to an embodiment.

FIG. 6 illustrates examples of operations that can be performed by the PTP inspector system of FIGS. 1-5 to determine inaccuracies in timestamps that are generated according to a transmission protocol, according to an embodiment. Initially, a transceiver circuit in an integrated circuit is configured according to one or more transmission protocols. The transceiver circuit includes a transmitter circuit and a receiver circuit. The transmission protocols may include, for example, PTP IEEE 1588 and/or Ethernet standards. The transceiver circuit includes multiple stage circuits that each perform at least one of the functions specified by a transmission protocol. For example, the stage circuits can perform the functions associated with the MAC, PCS, and PMA sublayers of Ethernet standards for transmitting and receiving data. PTP stage circuits 102 of FIG. 1 are examples of the stage circuits in the transceiver. The stage circuits in the transceiver are also enabled to generate timestamps that are used to synchronize clock signals in a computer network according to a protocol, such as PTP IEEE 1588. The stage circuits in the transceiver may, for example, function as deterministic latency logic circuits.

In operation 601, timing test patterns that indicate known traffic for a calibration and/or self-test of the stage circuits in the transceiver circuit are received by the transceiver circuit. For example, multiple PTP packets can be sent in Ethernet mode in order to determine the PTP timestamp accuracy range of the PTP stage circuits 102. In operation 602, each of the stage circuits in the transceiver circuit generates timestamps associated with the timing test patterns and triggers indicating a point in each packet in the timing test patterns. For example, each of the PTP stage circuits 102 may generate a timestamp in response to each packet in the timing test patterns and a trigger indicating the start or end of each of the packets. The timestamps and triggers are indicated by the respective sets of signals TSn and TRn in FIG. 1. In operation 603, the timestamps are provided to and stored in a memory circuit in response to the triggers. As an example, the timestamps can be provided to memory circuit 106 through multiplexer circuit 103 and stored in memory circuit 106 in response to the respective triggers being asserted. In operation 604, the timestamps and any other information that represents the source of timestamp inaccuracy are provided from the memory circuit to a post processor (e.g., post processor 109) for analysis, debug and optimization. As an example, system console 302 can interact with the DFT tool and retrieve the timestamps from the PTP inspector circuit 100 to plot the histogram or Gaussian distribution curve with statistical analysis (e.g., mean or standard deviation).

The PTP inspector system of FIGS. 1-6 can be used to identify the overall PTP timestamp accuracy range. With the PTP inspector system, a user can bring up their system with the provided hooks and debug features. A user is able to optimize the accuracy range even further with the ability of identifying and debugging the timestamp inaccuracy using the fine granularity of the PTP stage circuits 102 and circuits 107-108. The PTP inspector system disclosed herein can be used at the volume product stage, where an IC device product can be sorted out or binned using the design for test feature of the PTP inspector system, so that the accuracy data can be used as part of a quantifier of performance grade.

The PTP timestamp accuracy range determined using the PTP inspector system can be used for product planning and marketing of an IC device. For example, the PTP inspector system disclosed herein can be used in an application that requires highly accurate PTP timestamps, such as a wireless 5G system. The measured result may indicate the limit or boundary of legacy silicon performance. For example, outputs of the PTP inspector system may indicate the best results that can be achieved with a selected IC device. The PTP inspector system may also be used for tuning the PTP timestamp accuracy at the pre-silicon design validation and emulation stage during the planning of a future product. The strategy for a future product may, for example, be based on marketing requirements or product requirements that are based on customers' future product roadmaps.

The embodiments disclosed herein can be incorporated into any suitable integrated circuit or system. For example, the embodiments disclosed herein can be incorporated into numerous types of devices such as processor integrated circuits, central processing units, memory integrated circuits, graphics processing unit integrated circuits, application specific standard products (ASSPs), application specific integrated circuits (ASICs), and programmable logic integrated circuits. Examples of programmable logic integrated circuits include programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The integrated circuits disclosed in one or more embodiments herein may be part of a data processing system that includes one or more of the following components: a processor; memory; input/output circuitry; and peripheral devices. The data processing system can be used in a wide variety of applications, such as computer networking, data networking, instrumentation, video processing, digital signal processing, or any suitable other application. The integrated circuits can be used to perform a variety of different logic functions.

The following examples pertain to further embodiments. Example 1 is an integrated circuit comprising: a transceiver circuit that comprises stage circuits, wherein each of the stage circuits in the transceiver circuit performs at least one function specified by a data transmission protocol, wherein the transceiver circuit is coupled to receive packets of timing test patterns, wherein each of the stage circuits in the transceiver circuit generates a timestamp in response to receiving each of the packets of timing test patterns, and wherein each of the stage circuits in the transceiver circuit generates a trigger indicating receipt of a predefined reference point in each of the packets of timing test patterns; and a memory circuit that stores each of the timestamps generated by the stage circuits in response to the trigger generated by a respective one of the stage circuits, wherein the memory circuit outputs the timestamps for analysis.

In Example 2, the integrated circuit of Example 1 can optionally further comprise: a multiplexer circuit that provides each of the timestamps and each of the triggers from the transceiver circuit to the memory circuit.

In Example 3, the integrated circuit of any one of Examples 1-2 can optionally further include, wherein the memory circuit comprises a functional packet generator that generates the packets of timing test patterns using a vector of random access memory programmed as a protocol-specific functional generator of the packets of timing test patterns.

In Example 4, the integrated circuit of any one of Examples 1-3 can optionally further comprise: a multiplexer circuit configurable to provide the packets of timing test patterns from either the memory circuit or from a source external to the transceiver circuit.

In Example 5, the integrated circuit of any one of Examples 1-4 can optionally further comprise: a calculation circuit that calculates a frequency offset for a clock signal based on the timestamps generated by the stage circuits or based on a timestamp difference indicated by the triggers.

In Example 6, the integrated circuit of Example 5 can optionally further comprise: a timestamp computation circuit that adjusts a frequency of the clock signal based on the frequency offset, wherein the timestamp computation circuit uses the clock signal to generate a time of day value.

In Example 7, the integrated circuit of any one of Examples 1-6 can optionally further comprise: a time of day circuit that calculates an offset to a time of day value based on the timestamps generated by the stage circuits or a timestamp difference indicated by the triggers; and a timestamp computation circuit that synchronizes the time of day value with an additional time of day value generated by a master device using the offset to the time of day value.

In Example 8, the integrated circuit of any one of Examples 1-7 can optionally further comprise: a timestamp computation circuit that outputs timestamps for messages exchanged with a master device; and an accuracy binning module that segregates the timestamps generated by the stage circuits in bins based on a measured accuracy range of the timestamps generated by the stage circuits compared to the timestamps output by the timestamp computation circuit.

Example 9 is a data transmission system comprising: a transceiver circuit that comprises stage circuits, wherein each of the stage circuits in the transceiver circuit performs at least one function according to a data transmission protocol, wherein each of the stage circuits in the transceiver circuit generates a timestamp in response to receiving a packet comprising a test pattern; a memory circuit that stores the timestamps generated by the stage circuits; and a post processor circuit that receives the timestamps from the memory circuit, wherein the post processor circuit analyzes the timestamps to determine which of the stage circuit are generating inaccuracies in the timestamps, and wherein the post processor circuit calculates values for the inaccuracies identified in the timestamps.

In Example 10, the data transmission system of Example 9 can optionally further include, wherein the post processor circuit determines a difference between a delay indicated by a first subset of the timestamps generated by a transmitter circuit and a delay indicated by a second subset of the timestamps generated by a receiver circuit to identify an inaccuracy in the timestamps.

In Example 11, the data transmission system of any one of Examples 9-10 can optionally include, wherein each of the stage circuits in the transceiver circuit generates a trigger indicating receipt of a predefined reference point in the packet, and wherein the memory circuit stores each of the timestamps generated by the stage circuits in response to the trigger generated by a respective one of the stage circuits.

In Example 12, the data transmission system of Example 11 can optionally further comprise: a time of day circuit that calculates an offset to a time of day value based on the timestamps generated by the stage circuits or based on a timestamp difference indicated by the triggers.

In Example 13, the data transmission system of Example 12 can optionally further comprise: a timestamp computation circuit that synchronizes the time of day value with an additional time of day value generated by a master device using the offset to the time of day value.

In Example 14, the data transmission system of Example 11 can optionally further comprise: a calculation circuit that calculates a frequency offset for a clock signal based on the timestamps generated by the stage circuits or based on a timestamp difference indicated by the triggers.

In Example 15, the data transmission system of Example 14 can optionally further comprise: a timestamp computation circuit that adjusts a frequency of the clock signal based on the frequency offset, wherein the timestamp computation circuit uses the clock signal to generate a time of day value.

Example 16 is a method for determining inaccuracies in timestamps generated according to a data transmission protocol, the method comprising: receiving packets comprising test patterns at a transceiver circuit, wherein the transceiver circuit comprises stage circuits, and wherein each of the stage circuits in the transceiver circuit performs at least one function according to the data transmission protocol; generating a timestamp at each of the stage circuits in the transceiver circuit upon receipt of each of the packets; generating a trigger at each of the stage circuits in the transceiver circuit that indicates when each of the packets is received at a respective one of the stage circuits; and storing each of the timestamps generated by the stage circuits in a memory circuit in response to the trigger generated by the respective one of the stage circuits.

In Example 17, the method of Example 16 can optionally further comprise: determining inaccuracies in the timestamps generated by the stage circuits in the transceiver circuit using a post processor circuit by analyzing the timestamps to determine which of the stage circuits are generating the inaccuracies in the timestamps and calculating values for the inaccuracies identified in the timestamps.

In Example 18, the method of any one of Examples 16-17 can optionally further comprise: calculating an offset to a time of day value with a time of day circuit based on the timestamps generated by the stage circuits or based on a timestamp difference indicated by the triggers; and using the offset to the time of day value to synchronize the time of day value with a master time of day value using a timestamp computation circuit.

In Example 19, the method of any one of Examples 16-18 can optionally further comprise: calculating a frequency offset for a clock signal based on the timestamps generated by the stage circuits or a timestamp difference indicated by the triggers; adjusting a frequency of the clock signal using the frequency offset; and generating a time of day value in response to the clock signal using a timestamp computation circuit.

In Example 20, the method of any one of Examples 16-19 can optionally further comprise: outputting timestamps for messages exchanged with a master device from a timestamp computation circuit; and segregating the timestamps generated by the stage circuits in bins based on a measured accuracy range of the timestamps generated by the stage circuits compared to the timestamps output by the timestamp computation circuit.

The foregoing description of the exemplary embodiments of the present invention has been presented for the purpose of illustration. The foregoing description is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention.

What is claimed is:

1. An integrated circuit comprising:
a transceiver circuit that comprises stage circuits, wherein the transceiver circuit is coupled to receive packets of timing patterns, wherein the stage circuits generate timestamps and triggers, wherein each of the stage circuits in the transceiver circuit generates one of the timestamps in response to receiving each of the packets of the timing patterns, and wherein each of the stage circuits in the transceiver circuit generates one of the triggers indicating receipt of a predefined reference point in each of the packets of the timing patterns;
a memory circuit that stores each of the timestamps generated by the stage circuits in response to one of the triggers generated by a respective one of the stage circuits;
a calculation circuit that calculates a frequency offset for a clock signal based on at least one of the timestamps generated by the stage circuits or a timestamp difference indicated by the triggers; and
a timestamp computation circuit that adjusts a frequency of the clock signal based on the frequency offset, wherein the timestamp computation circuit uses the clock signal to generate a time of day value.

2. The integrated circuit of claim 1 further comprising:
a multiplexer circuit that provides each of the timestamps and each of the triggers from the transceiver circuit to the memory circuit.

3. The integrated circuit of claim 1, wherein the memory circuit comprises a functional packet generator that generates the packets of the timing patterns using a vector of random access memory programmed as a protocol-specific functional generator of the packets of the timing patterns.

4. The integrated circuit of claim 3 further comprising:
a multiplexer circuit configurable to provide the packets of the timing patterns from either the memory circuit or from a source external to the transceiver circuit.

5. The integrated circuit of claim 1,
wherein each of the stage circuits in the transceiver circuit performs at least one function specified by a data transmission protocol.

6. The integrated circuit of claim 1, wherein the memory circuit outputs the timestamps.

7. An integrated circuit comprising:
a transceiver circuit that comprises stage circuits, wherein the transceiver circuit is coupled to receive packets of timing patterns, wherein the stage circuits generate timestamps and triggers, wherein each of the stage circuits in the transceiver circuit generates one of the timestamps in response to receiving each of the packets of the timing patterns, and wherein each of the stage circuits in the transceiver circuit generates one of the triggers indicating receipt of a predefined reference point in each of the packets of the timing patterns;
a memory circuit that stores each of the timestamps generated by the stage circuits in response to one of the triggers generated by a respective one of the stage circuits;
a time of day circuit that calculates an offset to a time of day value based on at least one of the timestamps generated by the stage circuits or a timestamp difference indicated by the triggers; and
a timestamp computation circuit that synchronizes the time of day value with an additional time of day value generated by a device using the offset to the time of day value.

8. The integrated circuit of claim 7 further comprising:
an accuracy binning module that segregates the timestamps generated by the stage circuits in bins based on a measured accuracy range of the timestamps generated by the stage circuits compared to additional timestamps output by the timestamp computation circuit.

9. A data transmission system comprising:
a transceiver circuit that comprises stage circuits, wherein the stage circuits generate timestamps, and wherein each of the stage circuits in the transceiver circuit generates one of the timestamps in response to receiving a packet;
a memory circuit that stores the timestamps generated by the stage circuits; and
a post processor circuit that receives the timestamps from the memory circuit, wherein the post processor circuit analyzes the timestamps to determine which of the stage circuits are generating first inaccuracies in the timestamps, wherein the post processor circuit calculates values for the first inaccuracies identified in the timestamps, and
wherein the post processor circuit determines a difference between a delay indicated by a first subset of the timestamps generated by a transmitter circuit and a delay indicated by a second subset of the timestamps generated by a receiver circuit to identify a second inaccuracy in the timestamps.

10. The data transmission system of claim 9, wherein each of the stage circuits in the transceiver circuit performs at least one function according to a data transmission protocol.

11. The data transmission system of claim 9, wherein the stage circuits in the transceiver circuit generate triggers indicating receipt of predefined reference points in the packet, and wherein the memory circuit stores each of the timestamps generated by the stage circuits in response to one of the triggers generated by a respective one of the stage circuits.

12. The data transmission system of claim 11 further comprising:
a time of day circuit that calculates an offset to a time of day value based on the timestamps generated by the stage circuits or based on a timestamp difference indicated by the triggers.

13. The data transmission system of claim 12 further comprising:
a timestamp computation circuit that synchronizes the time of day value with an additional time of day value generated by a master device using the offset to the time of day value.

14. The data transmission system of claim 11 further comprising:
a calculation circuit that calculates a frequency offset for a clock signal based on the timestamps generated by the stage circuits or based on a timestamp difference indicated by the triggers.

15. The data transmission system of claim 14 further comprising:
a timestamp computation circuit that adjusts a frequency of the clock signal based on the frequency offset, wherein the timestamp computation circuit uses the clock signal to generate a time of day value.

16. A method for determining inaccuracies in timestamps, the method comprising:
receiving packets comprising patterns at a transceiver circuit, wherein the transceiver circuit comprises stage circuits;
generating one of the timestamps at each of the stage circuits in the transceiver circuit upon receipt of each of the packets;
generating triggers at the stage circuits, wherein each of the triggers generated at each of the stage circuits in the transceiver circuit indicates when each of the packets is received at a respective one of the stage circuits;
storing each of the timestamps generated by the stage circuits in a memory circuit in response to one of the triggers generated by the respective one of the stage circuits;
outputting additional timestamps for messages exchanged with a device from a timestamp computation circuit; and
segregating the timestamps generated by the stage circuits in bins based on a measured accuracy range of the timestamps generated by the stage circuits compared to the additional timestamps output by the timestamp computation circuit.

17. The method of claim 16 further comprising:
determining inaccuracies in the timestamps generated by the stage circuits in the transceiver circuit using a post processor circuit by analyzing the timestamps to determine which of the stage circuits are generating the inaccuracies in the timestamps and calculating values for the inaccuracies identified in the timestamps.

18. The method of claim 16 further comprising:
calculating an offset to a time of day value with a time of day circuit based on the timestamps generated by the stage circuits or based on a timestamp difference indicated by the triggers; and
using the offset to the time of day value to synchronize the time of day value with a master time of day value using the timestamp computation circuit.

19. The method of claim 16 further comprising:
calculating a frequency offset for a clock signal based on the timestamps generated by the stage circuits or a timestamp difference indicated by the triggers;
adjusting a frequency of the clock signal using the frequency offset; and
generating a time of day value in response to the clock signal using the timestamp computation circuit.

20. The method of claim 16,
wherein each of the stage circuits in the transceiver circuit performs at least one function according to a data transmission protocol.

* * * * *